United States Patent
Pratt et al.

(10) Patent No.: US 10,644,731 B2
(45) Date of Patent: May 5, 2020

(54) RADIO FREQUENCY TRANSMITTER NOISE CANCELLATION

(71) Applicant: Analog Devices International Unlimited Company, Limerick (IE)

(72) Inventors: Patrick Pratt, Mallow (IE); Peadar Antony Forbes, Cloghroe (IE); David J. McLaurin, Raleigh, NC (US); Martin McCormick, Cambridge, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 15/801,874

(22) Filed: Nov. 2, 2017

(65) Prior Publication Data
US 2018/0062675 A1    Mar. 1, 2018

Related U.S. Application Data

(62) Division of application No. 13/801,130, filed on Mar. 13, 2013, now Pat. No. 9,831,898.

(51) Int. Cl.
*H04B 1/04* (2006.01)
*H04B 1/525* (2015.01)

(52) U.S. Cl.
CPC ......... *H04B 1/0475* (2013.01); *H04B 1/525* (2013.01)

(58) Field of Classification Search
CPC .......................... H04B 1/0475; H04B 1/525
See application file for complete search history.

(56) References Cited

U.S. PATENT DOCUMENTS 3,605,012 A * 9/1971 Kubanoff ............... G01R 23/02
                                                324/76.68
4,835,765 A * 5/1989 Bergmans ................ H04B 3/23
                                                  370/291

(Continued)

FOREIGN PATENT DOCUMENTS

AU      3290784 A  *  3/1985  ........... H01Q 3/2617
CA      1224849 A  *  7/1987  ........... H01Q 3/2617

(Continued)

OTHER PUBLICATIONS

U.S. Appl. No. 14/874,883, filed Oct. 5, 2015, Method and Apparatus for Transmit Noise Reduction at a Receiver.

(Continued)

*Primary Examiner* — Berhanu Tadese
(74) *Attorney, Agent, or Firm* — Schwegman Lundberg & Woessner, P.A.

(57) ABSTRACT

Transmitter noise cancellation may be applied on a channel by channel basis to active channels of an incoming radio frequency signal received at a receiver. A noise cancellation filter may be provided for each active channel in a predetermined signal band. Applying noise cancellation on a per active channel basis instead of to the entire receive band may substantially reduce the filtering requirement and number of filter coefficients or taps to save power and reduce manufacturing costs. Channelized transmitter noise cancellers, multi transmitter-receiver cross coupling cancellers, and hybrid full signal band and channelized transmitter noise cancellers are also provided.

20 Claims, 7 Drawing Sheets

(56) References Cited

U.S. PATENT DOCUMENTS

| | | | |
|---|---|---|---|
| 5,105,377 A * | 4/1992 | Ziegler, Jr. | G10K 11/1782 381/71.11 |
| 5,251,262 A * | 10/1993 | Suzuki | G10K 11/178 381/71.8 |
| 5,321,759 A * | 6/1994 | Yuan | F01N 1/065 381/71.9 |
| 5,590,156 A | 12/1996 | Carney | |
| 5,691,978 A * | 11/1997 | Kenworthy | H04B 1/408 370/278 |
| 5,848,097 A | 12/1998 | Carney et al. | |
| 6,317,583 B1 | 11/2001 | Wolcott | |
| 6,594,367 B1 * | 7/2003 | Marash | G10K 11/341 367/119 |
| 6,745,018 B1 | 6/2004 | Zehavi et al. | |
| 6,760,342 B1 | 7/2004 | Skones et al. | |
| 6,898,235 B1 | 5/2005 | Carlin | |
| 6,925,435 B1 * | 8/2005 | Gao | G10L 21/0208 704/219 |
| 6,965,657 B1 | 11/2005 | Rezvani et al. | |
| 7,006,474 B2 | 2/2006 | Oates et al. | |
| 7,010,480 B2 * | 3/2006 | Gao | G10L 19/265 704/200.1 |
| 7,155,179 B1 | 12/2006 | Rothenberg | |
| 7,327,777 B2 | 2/2008 | Bergstrom et al. | |
| 7,555,075 B2 * | 6/2009 | Pessoa | G10L 21/0208 375/285 |
| 7,869,527 B2 * | 1/2011 | Vetter | H04L 27/366 375/259 |
| 8,103,235 B2 * | 1/2012 | Shiotsu | H04B 15/00 455/226.3 |
| 8,170,487 B2 | 5/2012 | Sahota et al. | |
| 8,290,100 B2 | 10/2012 | Komninakis et al. | |
| 8,320,866 B2 | 11/2012 | Pratt et al. | |
| 8,422,540 B1 * | 4/2013 | Negus | H04B 1/38 370/210 |
| 8,755,756 B1 * | 6/2014 | Zhang | H04B 1/109 455/114.2 |
| 8,798,559 B2 | 8/2014 | Kilambi et al. | |
| 9,083,582 B2 * | 7/2015 | Lukashevich | H04B 1/525 |
| 9,831,898 B2 * | 11/2017 | Pratt | H04B 1/0475 |
| 2002/0085647 A1 | 7/2002 | Oishi et al. | |
| 2002/0116182 A1 * | 8/2002 | Gao | G10L 19/265 704/205 |
| 2002/0142725 A1 | 10/2002 | Clelland et al. | |
| 2003/0076899 A1 | 4/2003 | Kumar | |
| 2003/0112370 A1 * | 6/2003 | Long | H04N 7/08 348/474 |
| 2003/0236067 A1 | 12/2003 | Hasarchi et al. | |
| 2004/0142700 A1 | 7/2004 | Marinier | |
| 2004/0203458 A1 | 10/2004 | Nigra | |
| 2005/0069046 A1 | 3/2005 | Tsui et al. | |
| 2005/0094714 A1 | 5/2005 | Robinson | |
| 2006/0015331 A1 * | 1/2006 | Hui | G10L 21/0272 704/227 |
| 2007/0183547 A1 | 8/2007 | Fifield et al. | |
| 2007/0184782 A1 | 8/2007 | Sahota et al. | |
| 2007/0237271 A1 * | 10/2007 | Pessoa | G10L 21/0208 375/346 |
| 2008/0031468 A1 * | 2/2008 | Christoph | G10K 11/178 381/71.2 |
| 2008/0095383 A1 * | 4/2008 | Pan | G10K 11/178 381/71.11 |
| 2008/0181422 A1 * | 7/2008 | Christoph | G10K 11/17817 381/73.1 |
| 2009/0012786 A1 * | 1/2009 | Zhang | G10L 21/0208 704/233 |
| 2009/0086863 A1 | 4/2009 | Komninakis et al. | |
| 2009/0186582 A1 * | 7/2009 | Muhammad | H04B 1/525 455/63.1 |
| 2009/0197558 A1 | 8/2009 | Shiotsu et al. | |
| 2009/0213770 A1 * | 8/2009 | Mu | H04B 1/123 370/281 |
| 2009/0275304 A1 | 11/2009 | Thomas et al. | |
| 2010/0040178 A1 | 2/2010 | Sutton et al. | |
| 2010/0093298 A1 * | 4/2010 | Pratt | H04B 1/109 455/226.1 |
| 2010/0098263 A1 * | 4/2010 | Pan | G10K 11/178 381/71.11 |
| 2010/0098265 A1 * | 4/2010 | Pan | G10K 11/178 381/94.1 |
| 2010/0124257 A1 | 5/2010 | Yahya | |
| 2010/0159837 A1 | 6/2010 | Dent et al. | |
| 2010/0165895 A1 | 7/2010 | Elahi et al. | |
| 2010/0167655 A1 | 7/2010 | Muhammad et al. | |
| 2011/0110409 A1 | 5/2011 | Sands et al. | |
| 2011/0149714 A1 | 6/2011 | Rimini et al. | |
| 2011/0158346 A1 | 6/2011 | Ballantyne | |
| 2011/0167025 A1 * | 7/2011 | Danai | G05B 17/02 706/12 |
| 2011/0195672 A1 * | 8/2011 | Pratt | H04B 1/525 455/78 |
| 2011/0195673 A1 * | 8/2011 | Pratt | H04B 1/52 455/78 |
| 2011/0300914 A1 | 12/2011 | Gudem et al. | |
| 2012/0140685 A1 | 6/2012 | Lederer | |
| 2012/0177213 A1 * | 7/2012 | Le Faucheur | H04R 1/1083 381/71.6 |
| 2012/0295558 A1 | 11/2012 | Wang et al. | |
| 2012/0322395 A1 | 12/2012 | Mccullagh | |
| 2013/0016798 A1 | 1/2013 | Velazquez et al. | |
| 2013/0044791 A1 | 2/2013 | Rimini et al. | |
| 2013/0114468 A1 * | 5/2013 | Hui | H01Q 3/2611 370/277 |
| 2013/0185084 A1 * | 7/2013 | Rajendran | G10L 19/04 704/500 |
| 2013/0215805 A1 * | 8/2013 | Hong | H04B 15/00 370/281 |
| 2013/0225099 A1 * | 8/2013 | Vosburgh | H04B 1/525 455/78 |
| 2013/0286903 A1 * | 10/2013 | Khojastepour | H04L 5/14 370/280 |
| 2013/0294295 A1 * | 11/2013 | Viswanathan | H04L 5/1461 370/278 |
| 2013/0315408 A1 * | 11/2013 | Yano | G10K 11/175 381/66 |
| 2014/0016515 A1 * | 1/2014 | Jana | H04L 5/143 370/278 |
| 2014/0050124 A1 * | 2/2014 | Yang | H04B 1/10 370/278 |
| 2014/0079167 A1 | 3/2014 | Adam et al. | |
| 2014/0105413 A1 * | 4/2014 | Clemow | G10K 11/178 381/71.8 |
| 2014/0185715 A1 | 7/2014 | Wollesen | |
| 2014/0194071 A1 | 7/2014 | Wyville | |
| 2014/0198688 A1 * | 7/2014 | Li | H04B 1/525 370/278 |
| 2014/0226587 A1 | 8/2014 | Tang et al. | |
| 2014/0269852 A1 * | 9/2014 | Pratt | H04B 1/0475 375/219 |
| 2014/0269858 A1 * | 9/2014 | Lukashevich | H04L 25/08 375/219 |
| 2015/0043685 A1 | 2/2015 | Choi et al. | |
| 2015/0078226 A1 | 3/2015 | Charlon et al. | |
| 2015/0180640 A1 * | 6/2015 | Liu | H04B 1/525 370/278 |
| 2015/0188646 A1 | 7/2015 | Bharadia et al. | |
| 2015/0311928 A1 * | 10/2015 | Chen | H04B 1/525 375/350 |
| 2016/0119019 A1 * | 4/2016 | Pratt | H04W 4/70 370/278 |
| 2016/0195606 A1 * | 7/2016 | Sugino | G01S 13/56 342/195 |
| 2016/0277046 A1 * | 9/2016 | Pratt | H04B 1/0475 |
| 2018/0062675 A1 * | 3/2018 | Pratt | H04B 1/0475 |

FOREIGN PATENT DOCUMENTS

| | | | | |
|---|---|---|---|---|
| CA | 2873411 A1 * | 11/2013 | | H04B 1/525 |
| CN | 1914812 A | 2/2007 | | |
| CN | 101060349 A | 10/2007 | | |

(56) References Cited

FOREIGN PATENT DOCUMENTS

| | | | | |
|---|---|---|---|---|
| CN | 101379718 A | 3/2009 | | |
| CN | 101453228 A | 6/2009 | | |
| CN | 101529729 A | 9/2009 | | |
| CN | 101895501 A | 11/2010 | | |
| CN | 101946416 A | 1/2011 | | |
| CN | 102771054 A | 11/2012 | | |
| CN | 104052522 A | 9/2014 | | |
| EP | 0700155 A1 | 3/1996 | | |
| EP | 1300958 A2 | 4/2003 | | |
| EP | 1551099 A1 * | 7/2005 | ............ | H03D 3/002 |
| EP | 2148480 A2 * | 1/2010 | ........ | H04L 25/0248 |
| EP | 2779469 A1 | 9/2014 | | |
| EP | 2779473 A2 | 9/2014 | | |
| EP | 2779473 A2 * | 9/2014 | ........... | H04B 1/0475 |
| EP | 2779473 A2 * | 9/2014 | ............ | H04B 1/525 |
| EP | 3070852 A1 | 9/2016 | | |
| JP | 07-235894 A | 9/1995 | | |
| JP | 07235894 A | 9/1995 | | |
| JP | 2009-522908 A | 6/2009 | | |
| JP | 2009522908 A | 6/2009 | | |
| JP | 2009-526442 A | 7/2009 | | |
| JP | 2009526442 A | 7/2009 | | |
| JP | 2011-509045 A | 3/2011 | | |
| JP | 2011509045 A | 3/2011 | | |
| KR | 20010062968 A | 7/2001 | | |
| KR | 10-0592595 B1 | 6/2006 | | |
| KR | 101652624 B1 | 8/2016 | | |
| WO | WO-2006066628 A1 * | 6/2006 | ........... | H03F 1/3252 |
| WO | WO-2007003233 A1 * | 1/2007 | ........ | H04L 27/2017 |
| WO | WO-2007078032 A1 | 7/2007 | | |
| WO | WO-2007078032 A1 * | 7/2007 | ........ | H04B 7/15585 |
| WO | WO-2007092767 A1 | 8/2007 | | |
| WO | WO-2008031454 A1 * | 3/2008 | ........... | H03G 3/3047 |
| WO | WO-2008089841 A1 * | 7/2008 | ........ | H04L 27/0014 |
| WO | WO-2008117127 A1 * | 10/2008 | ........... | H04B 7/0871 |
| WO | WO-2008146096 A1 * | 12/2008 | ............... | H04B 1/30 |
| WO | WO-2009019541 A1 * | 2/2009 | ........... | H04B 1/0475 |
| WO | WO-2009050537 A1 * | 4/2009 | ........... | H03F 1/3247 |
| WO | WO-2009088787 A1 | 7/2009 | | |
| WO | WO-2009090400 A1 | 7/2009 | | |
| WO | WO-2009156510 A2 | 12/2009 | | |
| WO | WO-2010020833 A1 * | 2/2010 | ............... | H03F 1/34 |
| WO | WO-2010023507 A1 * | 3/2010 | ............... | H03F 3/24 |
| WO | WO-2010026445 A1 * | 3/2010 | ........... | H03F 1/3247 |
| WO | WO-2010035065 A1 * | 4/2010 | ........... | H03F 1/3247 |
| WO | WO-2010042295 A2 * | 4/2010 | ............ | H04B 17/21 |
| WO | WO-2011148341 A1 | 12/2011 | | |
| WO | WO-2016043830 A1 | 3/2016 | | |

OTHER PUBLICATIONS

U.S. Appl. No. 13/801,130, filed Mar. 13, 2013, Radio Frequency Transmitter Noise Cancellation.
U.S. Appl. No. 14/168,881, filed Jan. 30, 2014, Transmitter Noise Cancellation in a Multi Transmitter-Receiver System, U.S. Pat. No. 9,083,582.
"Chinese Application Serial No. 201510044350.2, Office Action dated Oct. 31, 2017", 3 pgs.
"Chinese Application Serial No. 201610152668, Non Final Office Action dated Nov. 24, 2017", w/ English Claims, 13 pgs.
"European Application Serial No. 15151639.0, Office Action dated Jul. 20, 2018", 4 pgs.
"U.S. Appl. No. 13/801,130, Amendment Under 37 CFR 312 filed Sep. 25, 2017", 9 pgs.
"U.S. Appl. No. 13/801,130, Applicant's Summary of Examiner Interview filed Sep. 29, 2017", 1 pg.
"U.S. Appl. No. 13/801,130, Corrected Notice of Allowance dated Sep. 18, 2017", 3 pgs.
"U.S. Appl. No. 13/801,130, Corrected Notice of Allowance dated Nov. 1, 2017", 2 pgs.
"U.S. Appl. No. 13/801,130, Examiner Interview Summary dated Mar. 24, 2017", 3 pgs.
"U.S. Appl. No. 13/801,130, Final Office Action dated Nov. 6, 2015", 18 pgs.
"U.S. Appl. No. 13/801,130, Non Final Office Action dated Jan. 29, 2015", 24 pgs.
"U.S. Appl. No. 13/801,130, Non Final Office Action dated Jun. 9, 2014", 6 pgs.
"U.S. Appl. No. 13/801,130, Non Final Office Action dated Dec. 15, 2016", 28 pgs.
"U.S. Appl. No. 13/801,130, Notice of Allowance dated Jun. 29, 2017", 15 pgs.
"U.S. Appl. No. 13/801,130, PTO Response to Rule 312 Communication dated Oct. 19, 2017", 4 pgs.
"U.S. Appl. No. 13/801,130, Response filed Mar. 15, 2017 to Non Final Office Action dated Dec. 15, 2016", 14 pgs.
"U.S. Appl. No. 14/168,881, Interview Summary dated Feb. 24, 2015", 4 pgs.
"U.S. Appl. No. 14/168,881, Non-Final Office Action dated Nov. 28, 2014".
"U.S. Appl. No. 14/168,881, Notice of Allowance dated Mar. 12, 2015", 5 pgs.
"U.S. Appl. No. 14/168,881, Notice of Allowance dated Apr. 14, 2015", 2 pgs.
"U.S. Appl. No. 14/168,881, Notice of Allowance dated May 28, 2015", 2 pgs.
"U.S. Appl. No. 14/168,881, Response filed Feb. 19, 2015 to Non-Final Office Action dated Nov. 28, 2014", 6 pgs.
"U.S. Appl. No. 14/874,883, Final Office Action dated Jan. 30, 2017", 20 pgs.
"U.S. Appl. No. 14/874,883, Interview Agenda filed Mar. 22, 2017", 2 pgs.
"U.S. Appl. No. 14/874,883, Interview Summary dated Apr. 3, 2017", 5 pgs.
"U.S. Appl. No. 14/874,883, Non-Final Office Action dated Jul. 15, 2016", 15 pgs.
"U.S. Appl. No. 14/874,883, Response filed Oct. 17, 2016 to Non-Final Office Action dated Jul. 15, 2016", 13 pgs.
"Chinese Application Serial No. 201410092521.4, Office Action dated Feb. 14, 2017", (w/ English Translation), 13 pgs.
"Chinese Application Serial No. 201410092521.4, Office Action dated Jul. 20, 2016", (w/ English Translation), 8 pgs.
"Chinese Application Serial No. 201410092521.4, Office Action dated Sep. 1, 2015", (w/ English Translation), 12 pgs.
"Chinese Application Serial No. 201410092521.4, Response filed Mar. 16, 2016 to Office Action dated Sep. 1, 2015", (w/ English Translation of Amended Claims), 29 pgs.
"Chinese Application Serial No. 201410092521.4, Response dated Sep. 30, 2016 to Office Action dated Jul. 20, 2016", (w/ English Translation of Amended Claims), 17 pgs.
"Chinese Application Serial No. 201510044350.2, Office Action dated Apr. 6, 2017", with English Translation, 19 pgs.
"Chinese Application Serial No. 201510044350.2, Office Action dated Sep. 27, 2016", (w/ English Translation), 18 pgs.
"European Application Serial No. 14156668.7, European Search Report dated May 28, 2014", 6 pgs.
"European Application Serial No. 14156668.7, Office Action dated Feb. 11, 2015", 5 pgs.
"European Application Serial No. 14156668.7, Office Action dated Oct. 12, 2015", 3 pgs.
"European Application Serial No. 14156668.7, Response filed Jan. 16, 2015 to European Search Report dated May 28, 2014", 26 pgs.
"European Application Serial No. 14156668.7, Response filed Jun. 3, 2015 to Office Action dated Feb. 11, 2015", 19 pgs,.
"European Application Serial No. 14156668.7, Response filed Dec. 9, 2015 to Office Action dated Oct. 12, 2015", 14 pgs.
"European Application Serial No. 14158027.4, Office Action dated Sep. 29, 2014", 2 pgs.
"European Application Serial No. 14158027.4, European Search Report dated Aug. 27, 2014", 8 pgs.
"European Application Serial No. 14158027.4, Office Action dated Oct. 13, 2016", 6 pgs.
"European Application Serial No. 14158027.4, Partial European Search Report dated May 12, 2014", 6 pgs.

(56) References Cited

OTHER PUBLICATIONS

"European Application Serial No. 14158027.4, Response filed Mar. 20, 2015 to Office Action dated Sep. 29, 2014", 20 pgs.

"European Application Serial No. 15151639.0, Extended European Search Report dated Apr. 24, 2015", 7 pgs.

"European Application Serial No. 15151639.0, Response filed Nov. 19, 2015 to European Searcj Report dated Apr. 24, 2015", 13 pgs.

"European Application Serial No. 15151639.0, Response filed Nov. 19, 2015 to the Extended European Search Report dated Apr. 24, 2015", 13 pgs.

"European Application Serial No. 16159554.1, Extended European Search Report dated Aug. 1, 2016", 8 pgs.

"European Application Serial No. 17165294.4, Extended European Search Report dated Jun. 23, 2017", 8 pgs.

"German Application Serial No. 102016104467.9, Office Action dated Nov. 4, 2016", (w/ English Translation), 18 pgs.

"Japanese Application Serial No. 2014-048493, Office Action dated Feb. 2, 2015", (With English Translation), 4 pgs.

"Japanese Application Serial No. 2014-048493, Office Action dated Jun. 8, 2015", (With English Translation), 7 pgs.

"Japanese Application Serial No. 2014-048493, Written Amendment filed Oct. 8, 2015 in response to Office Action dated Jun. 8, 2015", (w/ English Translation of Amendments), 9 pgs.

"Japanese Application Serial No. 2014-048493, Written Argument and Amendments filed May 1, 2015 to Office Action dated Feb. 2, 2015", (w/ English Translation), 17 pgs.

"Korean Application Serial No. 10-2014-0027302, Final Office Action dated Mar. 8, 2016", (English Translation), 12 pgs.

"Korean Application Serial No. 10-2014-0027302, Office Action dated May 18, 2015", (w/ English Translation), 15 pgs.

"Korean Application Serial No. 10-2014-0027302, Office Action dated Nov. 13, 2015", (w/ English Translation), 8 pgs.

"Korean Application Serial No. 10-2014-0027302, Reply and Amendment filed Feb. 16, 2016 in response to Notice dated Nov. 13, 2015", (w/ English Translation), 8 pgs.

"Korean Application Serial No. 10-2014-0027302, Written Reply and Amendment filed Jul. 20, 2015 in response to Notification dated May 18, 2015", (w/ English Translation), 15 pgs.

"Korean Application Serial No. 10-2015-0015220, Office Action dated Feb. 5, 2016", (w/ English Translation), 11 pgs.

"Korean Application Serial No. 10-2015-0015220, Office Action dated May 23, 2016", (With English Translation), 3 pgs.

"Korean Application Serial No. 10-2015-0015220, Response filed Apr. 5, 2016 to Office Action dated Feb. 5, 2016", (English Translation of Claims), 20 pgs.

"Taiwanese Patent Application Serial No. 105102010, Office Action dated Dec. 9, 2016", (w/ English Translation), 16 pgs.

Amin, N. M., et al., "Transmit and Receive Crosstalk Cancellation", 2010 6th International Conference on Emerging Technologies, (2010), 210-215.

Aparin, Vladimir, et al., "Analysis and Reduction of Cross-Modulation Distortion in CDMA Receivers", IEEE Transactions on Microwave Theory and Techniques, 51(5), (May 2003), 1591-1602.

Araseki, T., "A Frequency Domain Adaptive Loop Canceller for Digital Terrestrial Broadcasting Systems", The Journal of the Institute of Image Information and Television Engineers, 56(8), (2002), 1342-1348.

Araseki, Takashi, "A Frequency Domain Adaptive Loop Canceller for Digital Terrestrial Broadcasting Systems", (w/ English Abstract), The Journal of the Institute of Image Information and Television Engineers, vol. 56, No. 8, (2002), 1342-1348.

Bellanger, Maurice G., et al., "TDM-FDM Transmultiplexer: Digital Polyphase and FFT", IEEE Transactions on Communications, 22(9), (Sep. 1974), 1199-1205.

Cruz, et al., "Receiver Front-End Architectures—Analysis and Evaluation", Advanced Microwave and Millimeter Wave Technologies, (Mar. 2010), 495-520.

Harris, et al., "Digital Receivers and Transmitters using Polyphase Filter Banks for Wireless Communications", IEEE Transactions on Microwave Theory and Techniques, 51(4), (Apr. 2003), 1395-1412.

Kim, Scott C., et al., "Implementation of a High-Throughput Low-Latency Polyphase Channelizer on CPU's", EURASIP Journal on Advances in Signal Processing, vol. 2014: 141, (Mar. 2014), 1-10.

Navarro, et al., "Channelization for Multi-Standard Software-Defined Radio Base Stations", A Thesis presented to the National University of Ireland NUL, Maymooth, (Oct. 2010), 277 pgs.

Navarro, Alvaro P., et al., "Efficient Channelization for PMR+4G and GSM Re-Farming Base Stations", Signals and Systems Conference (ISSC 2012), Maynooth, Jun. 28-29, 2012, (Jun. 2012), 1-6.

Omer, et al., "A PA-Noise Cancellation Technique for Next Generation Highly Integrated RF Front Ends", 2012 IEEE Radio Frequency Integrated Circuits Symposium, (2012), 471-474.

Pratt, Patrick J., et al., "Method of and Apparatus for Transmit Noise Reduction at a Receiver", U.S. Appl. No. 14/874,883, filed Oct. 5, 2015, 43 pgs.

Rashid-Farrokhi, et al., "Transmit Beamforming and Power Control for Cellular Wireless Systems", IEEE Journal on Selected Areas in Communications, 16(8), (1998), 1437-1450.

Shynk, John J., "Frequency-Domain and Multirate and Adaptive Filtering", IEEE Signal Processing Magazine, (Jan. 1992), 15-37.

* cited by examiner

RADIO FREQUENCY TRANSMITTER NOISE CANCELLATION

CLAIM OF PRIORITY

This application is a divisional of U.S. patent application Ser. No. 13/801,130, filed Mar. 13, 2013, which is hereby incorporated by reference in its entirety.

BACKGROUND

Radio frequency (RF) transmitter-receivers and transceivers have been capable of both transmitting and receiving RF signals. Typically, the transmit bands and the receive bands have been offset from each other to minimize interference at the receiver from the outgoing transmitter signals. Other interference reducing techniques, such as the use of special filters such as surface acoustic wave (SAW) filters have also been used to remove unwanted frequency components from the transmitted signals and reduce interference at the receiver.

Many transceivers today use digital predistortion techniques to generate more usable power from amplifiers, avoiding the need for larger amplifiers consuming more power. However, the use of these digital predistortion techniques caused additional transmitter noise to leak into the received signals at the receiver. The additional noise leakage has been reduced by increasing the size of the duplexer to achieve better isolation between transmit and receive bands. However, as wireless devices such as phones, tablets, and other RF devices become smaller and less expensive, these larger and more expensive duplexers have become impractical.

To reduce this additional transmitter noise, a noise cancellation filter covering the entire transmitted signal band was applied to a copy of the signals transmitted at the transmitter in order to estimate the noise from the transmitted signals that was expected to leak into the received signals. As a result, the cancellation filter required setting a large number of taps or filter coefficients that was very expensive to manufacture. The cost and resources required to provide and program this large number of taps make it impractical for many low cost applications. Additionally, each of these taps had to be powered so that as the number of taps increases, the total power consumption by the taps also increased making large numbers of taps impractical for use in low power applications.

Full band noise cancellation filter performance was also degraded by external blockers. External blockers may include signals within a receiver band but not in any active channels. For example, in cellular systems, an external blocker may include another operator's signal on different channels within a given band. Full band noise cancellation filters would consider these additional signals from external sources as noise since they were not included in the transmitted signal and this additional noise had slowed down the rate of convergence of the full band noise cancellation filter due to this additional noise. These external blockers also caused delays and errors during the adaptation process in which filter coefficients were adjusted to improve the noise cancelling capabilities of the full band filter.

In some instances, noise cancellation filters have been designed to be independent of a digital front end of a receiver circuit. This was done because some users prefer to use their own customized digital front end equipment for applying specialized signal processing to the received incoming signals. Digital front end circuits may include a digital down converter, channel specific filters, and other signal processing blocks customized for particular applications.

There is a need for a low power, reduced size RF noise cancellation circuit that is able to cost efficiently minimize transmitter noise leakage in received signals without having its adaptation rate reduced by external blockers. In some instances there is also a need for noise cancellation circuits that are digital front end independent so that customers can apply customized signal processing functions to the digitized received signals.

DETAILED DESCRIPTION

Noise cancellation may be applied on a channel by channel basis to a copy of an outgoing signal to be transmitted at the transmitter. The copy of the outgoing signal may be channelized and split up into separate channel components through a channelizing process. The digitized signals received at a receiver may also be channelized and split into separate signals on a channel by channel basis. A noise cancellation filter may be provided for each channel in a predetermined receive band. In some instances, one or more noise cancellation filters may be provided only for those active channel(s) within the predetermined receive band. In other instances the noise cancellation filter(s) may be provided for all channels, but only activated for active channel(s) within the receive band.

Applying noise cancellation on a per active channel basis instead of to the entire receive band may result in the removal of external blockers by an active channel filter before noise cancellation is applied. As a result, the adaptation rate of the channel specific noise cancellation filters need not be affected by external blockers and adaptation may occur at an original, uncompromised speed regardless of any external blockers.

Applying noise cancellation on a per active channel basis instead of to the entire receive band may also substantially reduce the filtering requirement and number of filter coefficients or taps of the noise cancellation filter. For example, full band filtering of Wideband Code Division Multiple Access (W-CDMA) signals may require the single filter to have at least several dozen if not one hundred or more taps more than each of individual channel filters when filtering is done on a channel by channel basis by, for example, splitting W-CDMA signals into 5 MHz channels and filtering only active channels. Since only the filters associated with active channels need to be powered, substantial power savings may be realized when filtering on an active channel basis.

A circuit in an embodiment may include a transmitter, a receiver, an analog to digital converter (ADC) coupled to the receiver, a channelizer coupled to the ADC, and a cancellation filter for each active channel of an incoming radio frequency signal received at the receiver. Each cancellation filter may be coupled to an output of the channelizer for the respective active channel. Each cancellation filter may be configured to estimate and cancel noise from the transmitter in each respective active incoming channel. In some instances the channelizer may include a digital downcoverter (DDC), which may be implemented with digital mixers, or a polyphase and/or fast Fourier transform transmultiplexer such as an orthogonal frequency-division multiplexing (OFDM) transmultiplexer that extracts individual subcarriers in an OFDM receiver.

A mixer may be coupled between the receiver and the ADC. The mixer may mix the incoming radio frequency signal with an oscillating signal. A radio frequency amplifier and a band pass filter may be coupled between the receiver and the mixer. A low pass filter may be coupled between the mixer and the ADC.

Figure 1:
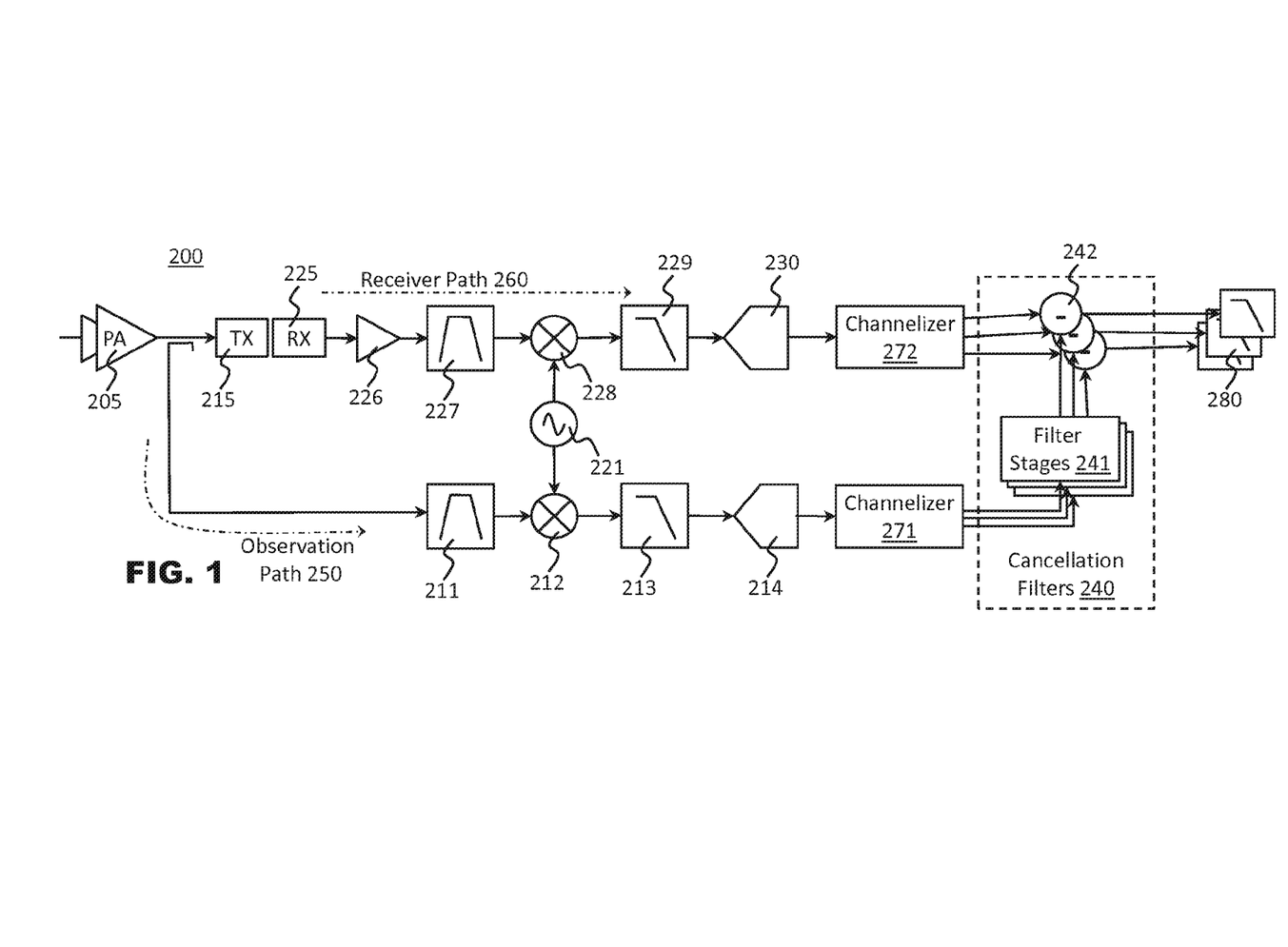
FIG. 1 shows a first exemplary circuit in an embodiment.

FIG. 1 shows an exemplary circuit 200 in an embodiment. A transmitter 215 may transmit outgoing RF signals. A receiver 225 may receive incoming RF signals. The transmitter 215 may be coupled to a RF power amplifier 205 that may amplify outgoing signals to drive an antenna of the transmitter 215. A first ADC 230 may be coupled to the receiver 225 and a first channelizer 272. An incoming RF signal received at receiver 225 may propagate along a receiver signal path 260. A second ADC 214 may be coupled to the transmitter 215 and a second channelizer 271. An outgoing signal to be transmitted at transmitter 215 may be propagated along observation path 250 from the output of the power amplifier 205 in addition to being transmitted at transmitter 215.

Each channelizer 271 and 272 may channelize the signals outputted by the respective ADC 214 and 230. During the channelizing, the channelizers 271 and 272 may split the respective signals into separate channels on a channel by channel basis. Thus, in some instances, the channelizers 271 and 272 may include a separate output for each channel with an incoming RF signal band. In some instances, the channelizers may only output signals on a channel by channel basis for those channels that are active. The channelizers 271 and 272 need not generate output signals for inactive channels. In some instances, the channelizers 271 and 272 may include a DDC, a polyphase, a fast Fourier transform, and/or other type of transmultiplexer.

In some instances, a cancellation filter 240 may be provided for each of the channels within the incoming RF signal band. In other instances, a cancellation filter 240 may only be provided for only those active channel(s) within the signal band. Each cancellation filter 240 may be coupled to an output of the first and second channelizers 272 and 271 for the respective channel. Each cancellation filter 240 may be configured to estimate and cancel noise from the transmitter 215 in each respective active incoming channel.

Each cancellation filter 240 may include a filter stage 241 coupled to a subtractor 242. The subtractor 242 for the cancellation filter 240 in each active channel may be coupled to a respective channel output of the first channelizer 272. The filter stage 241 for the cancellation filter 240 in each active channel may be coupled to a respective channel output of the second channelizer 271. A common channel filter 280 may be provided for each active channel and coupled to an output of the subtractor 242 for the respective active channel.

In some instances, a first mixer 228 may be coupled to the receiver 225 and the first ADC 230. The first mixer may mix the incoming radio frequency signal with an oscillating signal from an oscillating source 221. A second mixer 212 may be coupled to the transmitter 215 and the second ADC 214. The second mixer 212 may mix the outgoing signal with the oscillating signal from the oscillating source 221. A radio frequency amplifier 226 and a first band pass filter 227 may be coupled between the receiver 225 and the first mixer 228. A second band pass filter 211 coupled to the transmitter 215 and the second mixer 212. A first low pass filter 229 may be coupled to the first mixer 228 and the first ADC 230. A second low pass filter 213 may be coupled to the second mixer 212 and the second ADC 214.

Figure 2:
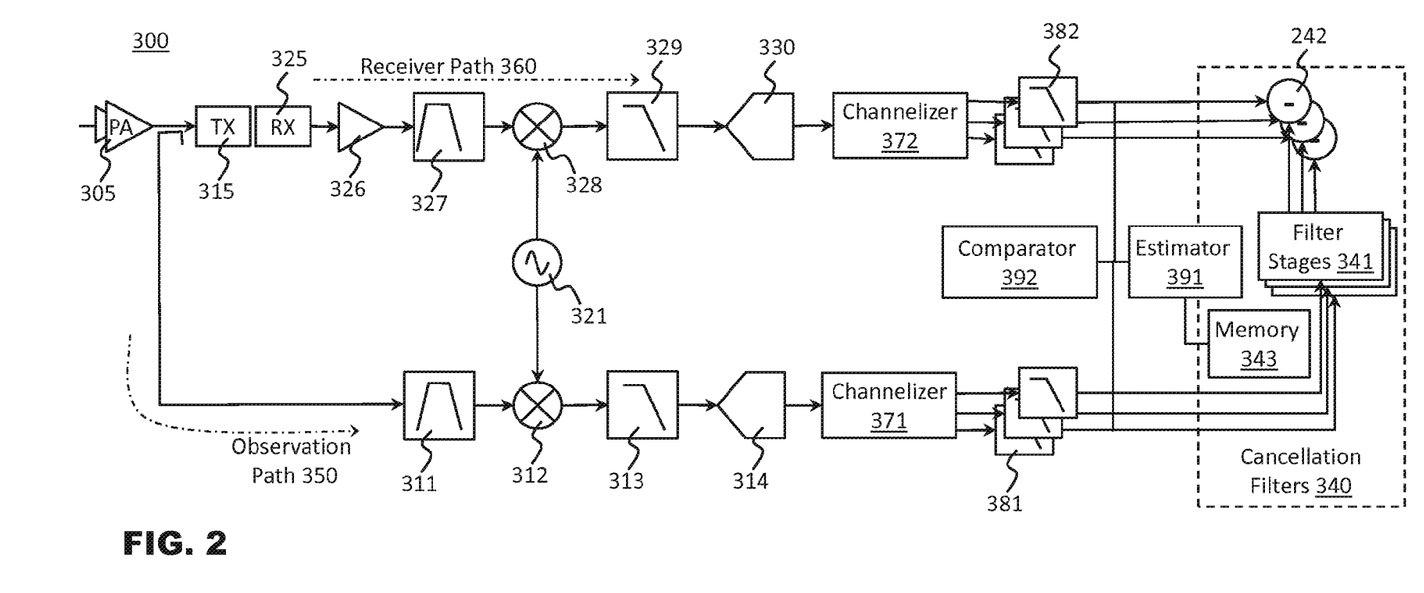
FIG. 2 shows a second exemplary circuit in an embodiment.

FIG. 2 shows an embodiment 300 in which channel filtering is provided on both the receiver signal path 360 and the observation signal path 350. A transmitter 315 may transmit outgoing RF signals. A receiver 325 may receive incoming RF signals. The transmitter 315 may be coupled to a RF power amplifier 305 that may amplify outgoing signals to drive an antenna of the transmitter 315. A first ADC 330 may be coupled to the receiver 325 and a first channelizer 372. An incoming RF signal received at receiver 325 may propagate along a receiver signal path 360. A second ADC 314 may be coupled to the transmitter 315 and a second channelizer 371. An outgoing signal to be transmitted at transmitter 315 may be propagated along observation path 350 from the output of the power amplifier 305 in addition to being transmitted at transmitter 315.

Each channelizer 371 and 372 may channelize the signals outputted by the respective ADC 314 and 330. During the channelizing, the channelizers 371 and 372 may split the respective signals into separate channels on a channel by channel basis. Thus, in some instances, the channelizers 371 and 327 may include a separate output for each channel with an incoming RF signal band. In some instances, the channelizers may only output signals on a channel by channel basis for those channels that are active. The channelizers 371 and 372 need not generate output signals for inactive channels. In some instances, the channelizers 371 and 372 may include a DDC, a polyphase, a fast Fourier transform, and/or other type of transmultiplexer.

In some instances, a cancellation filter 340 may be provided for each of the channels within the incoming RF signal band. In other instances, a cancellation filter 340 may only be provided for only those active channel(s) within the signal band. Each cancellation filter 240 may include a filter stage 241 coupled to a subtractor 242.

Channel filters 381 and 382 may also be provided for the different channels in both the receiver signal path 360 and the observation signal path 350. Each channel filter in a first set of channel filters 382 may be coupled to a respective channel output of the first channelizer 372 and to a respective filter stage 341 of the cancellation filter 340 associated with the respective channel. Each channel filter in a second set of channel filters 381 may be coupled to a respective channel output of the second channelizer 371 and to a respective subtractor 342 of the cancellation filter 340 for the respective channel. Each cancellation filter 340 may be configured to estimate and cancel the channel filtered noise from the transmitter 315 in each respective active incoming channel.

In some instances, a first mixer 328 may be coupled to the receiver 325 and the first ADC 330. The first mixer may mix the incoming radio frequency signal with an oscillating signal from an oscillating source 321. A second mixer 312 may be coupled to the transmitter 315 and the second ADC 314. The second mixer 312 may mix the outgoing signal with the oscillating signal from the oscillating source 321. A radio frequency amplifier 326 and a first band pass filter 327 may be coupled between the receiver 325 and the first mixer 328. A second band pass filter 311 coupled to the transmitter 315 and the second mixer 312. A first low pass filter 329 may be coupled to the first mixer 328 and the first ADC 330. A second low pass filter 313 may be coupled to the second mixer 312 and the second ADC 314.

In some instances, an estimator 391 may be coupled to the outputs of the channel filters 381 and 382. The estimator 391 may be configured to estimate new filter coefficients on one or more of the channels based on the filtered signals from the channel filters 381 and 382 on the respective channel(s). The estimator 391 may use an estimation algorithm, such as a minimum mean square, least squares, recursive least squares, least mean squares, or other algorithm to estimate these filter coefficients. The filter coefficients may be estimated periodically at predetermined intervals or at other predetermined events, such as when the receiver and/or transmitter are offline, just starting up, or at other times. The estimator 391 may generate updated filter coefficients for a filter in the filter stage 341 of a respective active channel based on the coefficient estimates for the respective active channel. Each filter stage 341 may have an asymmetric frequency response and complex filter coefficients since the outputs from channelizer 371 may be complex valued.

In some instances, a comparator 392 may be coupled to the estimator 391. The comparator 392 may include logic for comparing a root mean square (RMS) power of the outgoing signal on the observation signal path 350 and the incoming signal on the receiver signal path 360. In some instances the comparator 392 may compare the power of incoming signal on the receiver signal path 360 to a predetermined maximum value or to the corresponding power of the outgoing signal. The comparator 392 may also include logic for activating the minimum mean square filter coefficient estimator 391 when the power of the incoming signal is less than the predetermined maximum value or when a difference of the compared power values of the incoming and outgoing signals exceeds a threshold. The activation of the estimator 391 by the comparator 392 may trigger the estimator 391 to generate updated filter coefficients for the filter stage 341 of at least one of the channels. The cancellation filters 340 may include a memory 343 storing filter coefficients and the updated filter coefficients for the filters in the filter stages 341.

Figure 3:
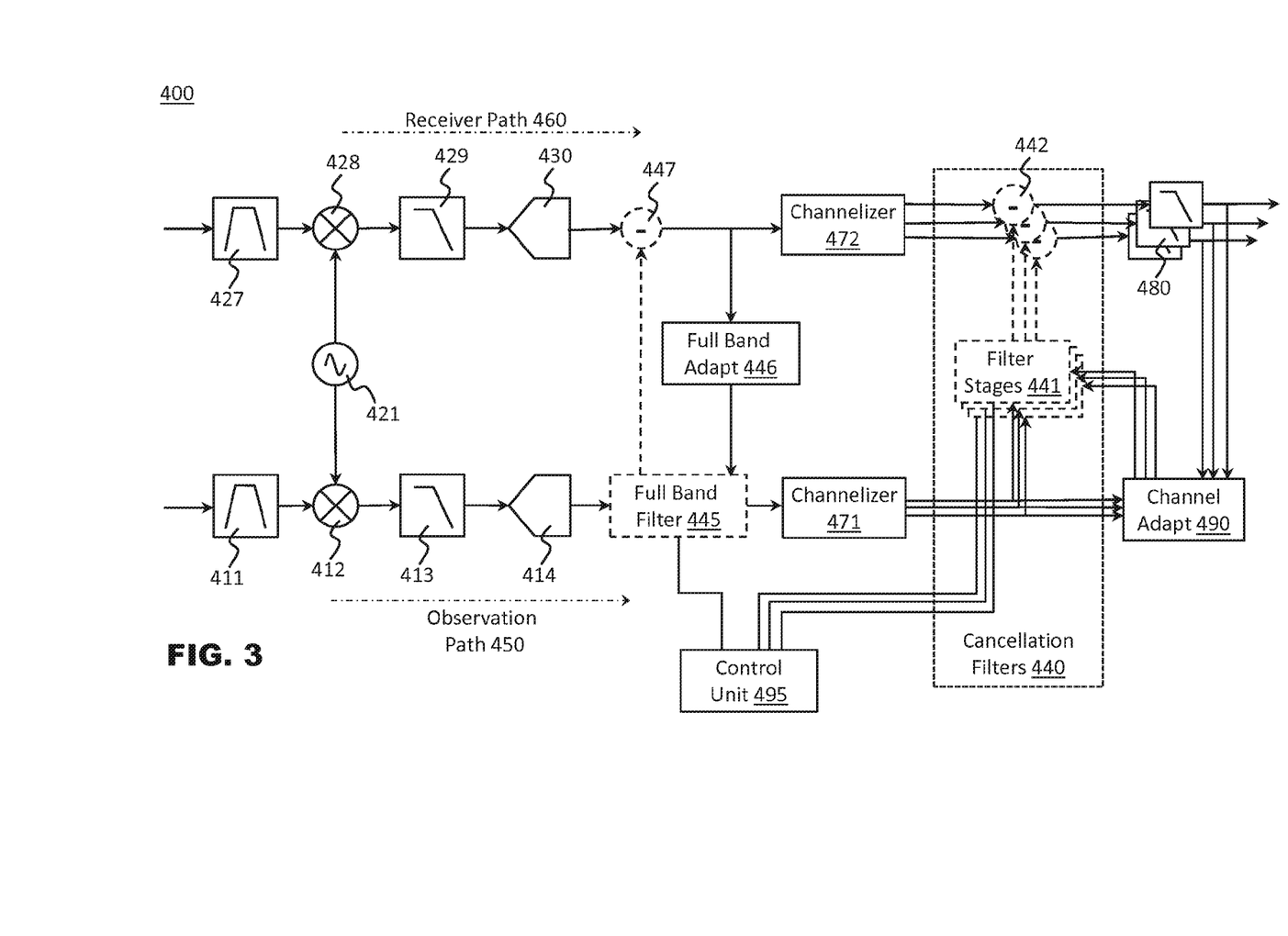
FIG. 3 shows a third exemplary circuit in an embodiment.

FIG. 3 shows an exemplary hybrid circuit 400 in an embodiment. A first ADC 430 may be coupled to a receiver (not shown) as in the other figures and a first channelizer 472. An incoming RF signal received at the receiver may propagate along a receiver signal path 460. A second ADC 414 may be coupled to a transmitter (not shown) as in the other figures and a second channelizer 471. An outgoing signal to be transmitted may be propagated along observation path 450 in addition to being transmitted.

Each channelizer 471 and 472 may down convert and/or channelize the signals outputted by the respective ADC 414 and 430. During the channelizing, the channelizers 471 and 472 may split the respective signals into separate channels on a channel by channel basis. Thus, in some instances, the channelizers 471 and 472 may include a separate output for each channel with an incoming RF signal band. In some instances, the channelizers may only output signals on a channel by channel basis for those channels that are active. The channelizers 471 and 472 need not generate output signals for inactive channels. In some instances, the channelizers 471 and 472 may include a DDC, a polyphase, a fast Fourier transform, and/or other type of transmultiplexer.

Two types of cancellation filters 445 and 440 may be provided. A full band cancellation filter 445 may be coupled to the second ADC 414, the second channelizer 471, and a subtractor 447. The subtractor 447 may also be coupled to the first ADC 430 and the first channelizer 471. A full band filter adaptation unit 446, which may include an estimator such as estimator 391, may be used to calculate updated filter coefficients for the full band cancellation filter 445. The full band filter adaptation unit 446 may also be coupled to the receiver signal path 460, in some instances between the subtractor 447 and first channelizer 472.

Channel specific cancellation filters 440 may be provided for each of the channels within the incoming RF signal band. In other instances, channel specific cancellation filters 440 may only be provided for only those active channel(s) within the signal band. Each cancellation filter 440 may be coupled to an output of the first and second channelizers 472 and 471 for the respective channel. Each cancellation filter 440 may be configured to estimate and cancel transmitter noise in each respective active incoming channel.

Each cancellation filter 440 may include a filter stage 441 coupled to a subtractor 442. The subtractor 442 for the cancellation filter 440 in each active channel may be coupled to a respective channel output of the first channelizer 472. The filter stage 441 for the cancellation filter 440 in each active channel may be coupled to a respective channel output of the second channelizer 471. A common filter 480 may be provided for each active channel and coupled to an output of the subtractor 442 for the respective active channel.

A channel filter adaptation unit 490 may be coupled to each channel output of the second channelizer 471, each filter stage 441, and the subtractor 442 and/or common filter 480 for each channel. The channel filter adaptation unit 490 may include an estimator 391 and/or comparator 392 providing the same functionality discussed previously. The full band and channel cancellation filters 445 and 440 may include a memory storing filter coefficients and the updated filter coefficients for the filters 445 and 440.

The full band and channel cancellation filters 445 and 440 may be coupled to a control unit 495 configured to selectively enable and disable each of the filters 445 and 440 to provide the option of using only the full band filter 445, only the channel filter 440, or both filters 445 and 440. The control unit 495 may be configured to select the full band filter 445 in situations where active channels may be concentrated over one contiguous region of the signal band or where signal isolation characteristics do not require complex filtering requiring a large number of filter coefficients to isolate transmitter noise.

The control unit 495 may be configured to select channel filters 440 in situations where the active channels are discontiguously spread across the signal band and located in regions requiring a large number of filter coefficients to isolate transmitter noise. Configuring the control unit 495 to toggle between the channel filters 440 and full band filter 445 may result in improved performance in situations where the low order full band filter 445 is used in low complexity regions discussed above and the channelized filters 440 are only applied to active channels of high complexity.

The filter coefficients of the full band filter 445 and the channel filters 440 may be updated by their respective adaptation units 446 and 490. The coefficient updating processes in these adaptation units 446 and 490 may be performed at different intervals. For example, the filter coefficients of the full band filter 445 may only be configured once in some instances, but the filter coefficients of the channel filters 440 may be configured each time the circuit 400 is powered up or on another periodic basis, such as in one non-limiting example, when the main power level of the received incoming signal is low enough or satisfies some other criteria.

In some instances, a first mixer 428 may be coupled to the receiver and the first ADC 430. The first mixer 428 may mix the incoming radio frequency signal with an oscillating signal from an oscillating source 421. A second mixer 412 may be coupled to the transmitter and the second ADC 414. The second mixer 412 may mix the outgoing signal with the oscillating signal from the oscillating source 421. A radio frequency amplifier 426 and a first band pass filter 427 may be coupled between the receiver and the first mixer 428. A second band pass filter 411 coupled to the transmitter 415 and the second mixer 412. A first low pass filter 429 may be coupled to the first mixer 428 and the first ADC 430. A second low pass filter 413 may be coupled to the second mixer 412 and the second ADC 414.

Figure 4:
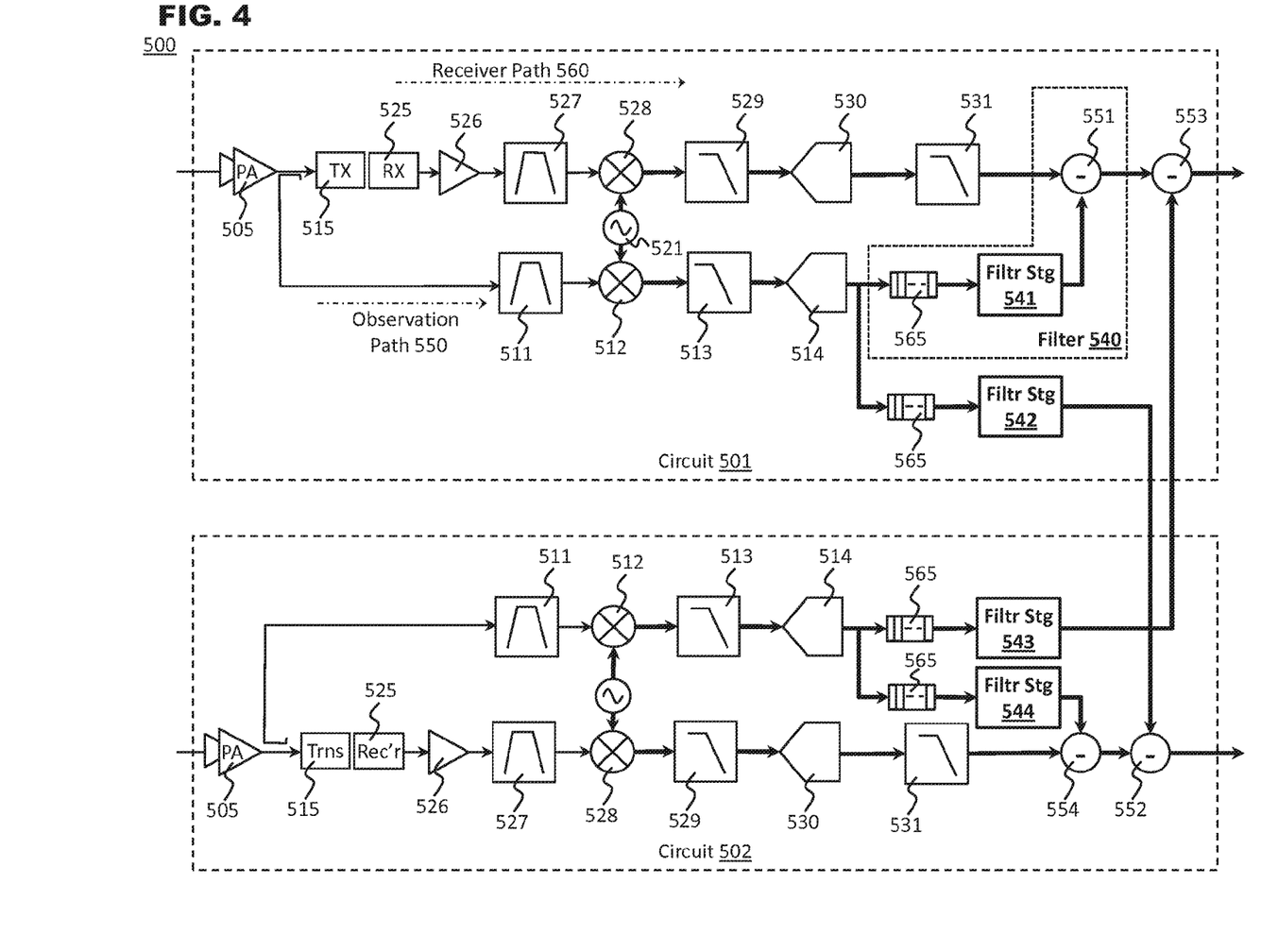
FIG. 4 shows a fourth exemplary circuit in an embodiment.

FIG. 4 shows a multi transmitter-receiver cross coupled noise cancellation circuit in an embodiment. In this example, only two transmitter-receiver pairs are shown in respective cross coupled circuits 501 and 502, but other embodiments may include additional transmitters and/or receivers. Circuits 501 and 502 may each include similar components.

For example, each circuit 501 and 502 may include a transmitter 515 transmitting outgoing RF signals, and a receiver 525 receiving incoming RF signals. Each transmitter 515 may be coupled to a RF power amplifier 505 that may amplify outgoing signals to drive an antenna of the transmitter 515. Each circuit 501 and 502 may include a first ADC 530 coupled to its receiver 525. An incoming RF signal received at each receiver 525 may propagate along each respective receiver signal path 560. Each circuit 501 and 502 may include a second ADC 514 coupled to its respective transmitter 515. An outgoing signal to be transmitted at each transmitter 515 may be propagated along a respective observation path 550 from the output of the power amplifier 505 in addition to being transmitted at transmitted at its respective transmitter 515.

In some instances, each circuit 501 and 502 may include a cancellation filter stage 541 to 544 for each of the receivers included in the embodiment. For example, since FIG. 4 includes two receivers, each of the transmitters 515 may have two cancellation filter stages 541-542 and 543-544. In other instances with different numbers of receivers, the number of filter stages would be adjusted accordingly. Each of the filter stages 541 to 544 may also be coupled to a respective subtractor 551 to 554 and its corresponding second ADC 514.

Each of the filter stages 541 to 544 may be configured to estimate and cancel transmitter noise between the transmitter 515 that the filter stage 541 to 544 is coupled to and a respective one of the incoming signals received at each receiver 525. Thus, filter stage 541 and its subtractor 551 may be configured to reduce transmitter noise from transmitter 515 in circuit 501 from the incoming signal received at receiver 525 of circuit 501. Filter stage 542 and its subtractor 552 may be configured to reduce transmitter noise from transmitter 515 in circuit 501 from the incoming signal received at receiver 525 of circuit 502. Filter stage 543 and its subtractor 553 may be configured to reduce transmitter noise from transmitter 515 in circuit 502 from the incoming signal received at receiver 525 of circuit 501. Filter stage 544 and its subtractor 554 may be configured to reduce transmitter noise from transmitter 515 in circuit 502 from the incoming signal received at receiver 525 of circuit 502.

A low pass filter 531 in circuit 501 may be coupled to the ADC 530 of circuit 501 and subtractors 551 and 553 of filter stages 541 and 543. A low pass filter 531 in circuit 502 may be coupled to the ADC 530 of circuit 502 and subtractors 552 and 554 of filter stages 542 and 544.

In some instances, circuits 501 and 502 may include a first mixer 528 coupled to its receiver 525 and its first ADC 530. The first mixer may mix the incoming radio frequency signal with an oscillating signal from an oscillating source 521. Circuits 501 and 502 may include a second mixer 512 coupled to its respective transmitter 515 and second ADC 514. The second mixer 512 may mix the outgoing signal with the oscillating signal from the oscillating source 521. Circuits 501 and 502 may include a radio frequency amplifier 526 and a first band pass filter 527 coupled between its respective receiver 525 and first mixer 528. Circuits 501 and 502 may include a second band pass filter 511 coupled to its respective transmitter 515 and second mixer 512. Circuits 501 and 502 may include a first low pass filter 529 coupled to its respective first mixer 528 and first ADC 530. Circuits 501 and 502 may include a second low pass filter 513 coupled to the second mixer 512 and the second ADC 514.

An alignment module 565 may be coupled between one or more filter stages 541 and the second ADC 514 in each circuit 501 and 502. The alignment module 565 may be configured to add a delay or otherwise time align the outgoing signal with the received incoming signal to cancel the transmitter noise from the corresponding received incoming signal.

In instances where the outgoing and incoming signals are channelized through respective channelizers or other circuits configured to split the signals on a channel by channel basis, each of the filter stages 541 to 544 and subtractors 551 to 554 may be provided for each of the channels. In some instances, the channelizers may include a DDC, a polyphase, a fast Fourier transform, and/or other type of transmultiplexer. Thus, if the signal band of the incoming signal contains n channels, there may be n copies of filter stage 541 and subtractor 551 for each of the n channels, n copies of filter stage 542 and subtractor 552 for each of the n channels, n copies of filter stage 543 and subtractor 553 for each of the n channels, and n copies of filter stage 544 and subtractor 554 for each of the n channels. Thus, variations of the cross coupled noise cancellation circuit may include the noise filter channelization arrangements shown in the other figures and discussed herein.

A multi transmitter-receiver noise cancellation circuit, such as that shown in FIG. 4, may in some instances include a number n of circuits similar to circuits 200, 300, 501 and/or 502, where n is two or more. Each of these circuits may include the same number n of cancellation filters for each active channel. Each of the filter stages of the n cancellation filters for each active channel may be coupled to a respective channel output of the second channelizer for the respective circuit. The subtractor of each cancellation filter for each active channel may be coupled to a respective channel output of the first channelizer for a respective circuit for each of the circuits from 1 to n.

A noise cancellation circuit in an embodiment may also include two or more receivers, each coupled to a respective analog to digital converter (ADC) and a respective channelizer. The noise cancellation circuit may also include two or more transmitters, each also coupled to a respective analog to digital converter (ADC) and a respective channelizer. The noise cancellation circuit may also include a plurality of cancellation filters with at least one cancellation filter coupled between each of the transmitter channelizers and the receiver channelizers.

Figure 5:
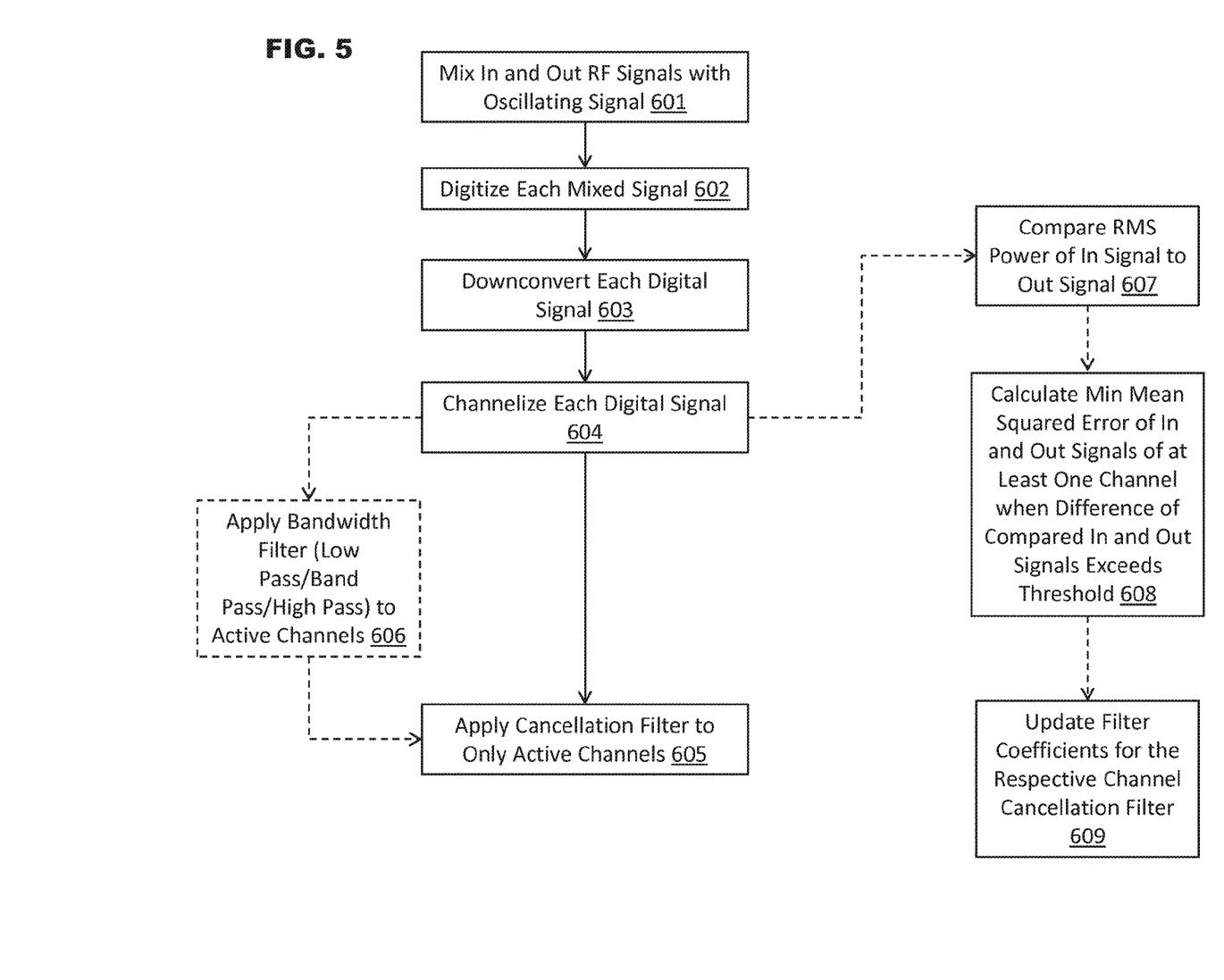
FIG. 5 shows exemplary methods in embodiments.

FIG. 5 shows an exemplary process in an embodiment. In box 601, incoming received RF signals and outgoing RF transmission signals may be mixed with an oscillating signal.

In box 602, each of the mixed signals may be digitized.

In box 603, each of the digitized signals may be digitally down converted.

In box 604, each of the digitized signals may be channelized or split on a channel by channel basis into respective channel components. The digitized signals may in some instances be channelized as part of a digital down conversion process.

In box 605, a noise cancellation filter may be applied to only the identified active channels of the channelized down converted signals. A separate noise cancellation filter may be provided for each channel.

In box 606, a channel filter may be applied to each of the channelized down converted signals before applying the noise cancellation filter. The channel filter may be a low pass filter, a band pass filter, or other filter.

In box 607, a root mean square (RMS) power of the incoming signal may be compared to that of the outgoing signal.

In box 608, a minimum mean square error of the channel filtered incoming and outgoing down converted signals may be calculated for each channel when a difference of the compared RMS power exceeds a threshold.

In box 609, filter coefficients for the noise cancellation filter provided for at least one channel may be updated based on the calculated minimum mean square error.

Figure 6:
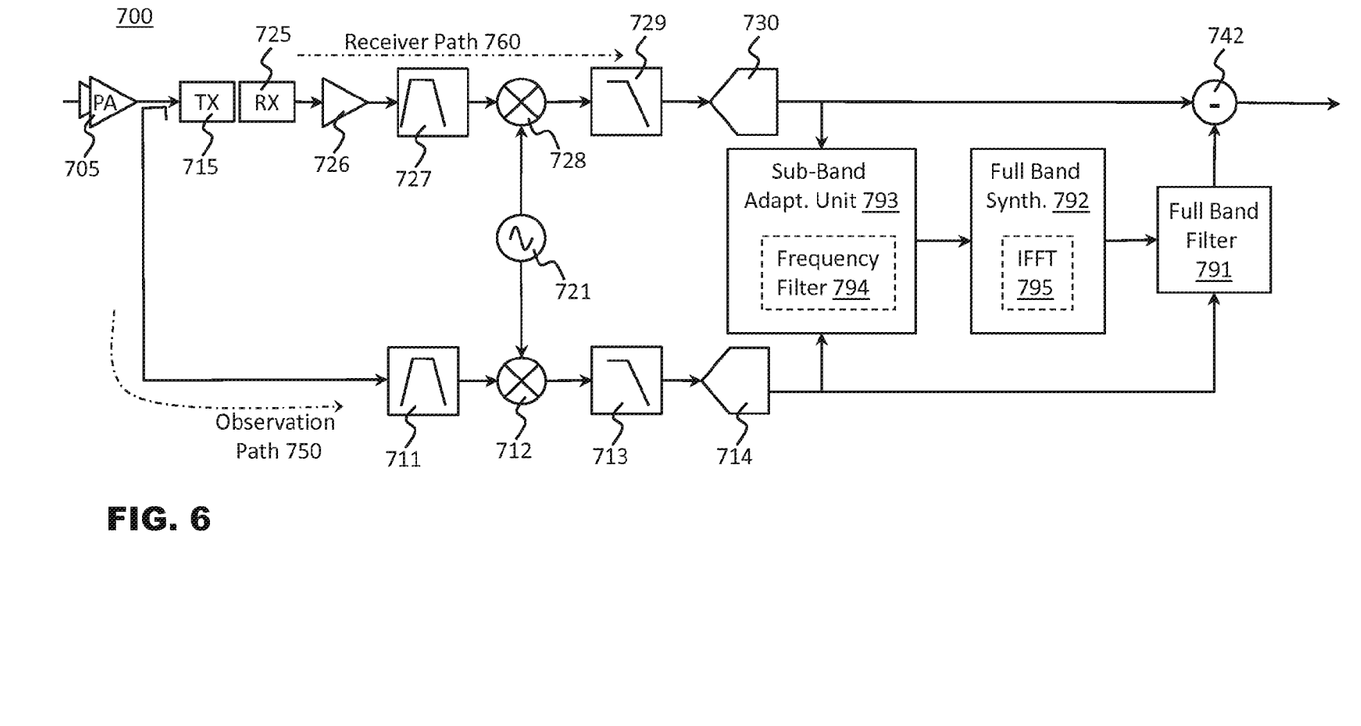
FIG. 6 shows a fifth exemplary circuit in an embodiment.

FIG. 6 shows an embodiment 700 in which filter coefficients of a full band filter 791 are adapted on a sub-band basis. A transmitter 715 may transmit outgoing RF signals. A receiver 725 may receive incoming RE signals. The transmitter 715 may be coupled to a RF power amplifier 705 that may amplify outgoing signals to drive an antenna of the transmitter 715. A first ADC 730 may be coupled to the receiver 725, a channel sub-band adaptation unit 793, and a subtractor 742. An incoming RF signal received at receiver 725 may propagate along a receiver signal path 760. A second ADC 714 may be coupled to the transmitter 715, the channel sub-band adaptation unit 793, and full band noise cancellation filter 791. The full band filter 791 may be coupled to the subtractor 742 and ADC 714. The subtractor 742 may subtract the estimated noise outputted by the full band filter 791 from the digitized received incoming signal. An outgoing signal to be transmitted at transmitter 715 may be propagated along observation path 750 from the output of the power amplifier 705 in addition to being transmitted at transmitted at transmitter 715.

The channel sub-band adaptation unit 793 may estimate filter coefficients on one or more of sub-bands of the received incoming signals. A sub-band may include any subdivision of a designated full signal band and may include one or more channels or subportions thereof. By estimating the filter coefficients on a sub-band basis, the estimates may need only be performed on activate channels or sub-bands. This avoids the need to estimate filter coefficients on inactive channels that may contain external blockers or signals from other sources appearing the designated signal band. The channel sub-band adaptation unit 793 may therefore eliminate any influence of external blockers by limiting its analysis to only those active channels. This improves the accuracy and convergence times of the estimation process. A sub-band to full band synthesizer 792 coupled to the adaptation unit 793 may then reconstruct estimated filter coefficients for the full signal band from the individual estimates for each sub-band performed by the sub-band adaptation unit 793.

In some instances, the channel sub-band adaptation unit 793 may include a frequency domain adaptive filter 794. A frequency domain adaptive filter 794 may perform adaptation by estimating coefficients for each sub-band in a frequency domain. Different sub-bands may be assigned to different bins corresponding to particular frequency ranges. Bins for different sub-bands may be weighted differently according to the estimates for the respective sub-band. External blockers may be rejected by weighting the bins corresponding to frequency ranges of the external blockers accordingly.

The estimated coefficients for each sub-band may be based on a comparison of the digitized received incoming signal to the digitized outgoing signal transmitted at the transmitter 715. To make this comparison, the sub-band adaptation unit 793 may be coupled to both the ADC 730 in the receiver path 760 and then ADC 714 in the observation path 750. The estimated coefficients for the one or more sub-bands may then be used to independently adapt each respective sub-band. In some instances, this adaptation may occur in real time, but in other instances the estimation and adaptation may be delayed. In some instances the adaptation of one or more sub-bands may occur off-line during an interval when the receiver is not receiving any incoming signals or in non-real time.

The channel sub-band adaptation unit 793 may use an estimation algorithm, such as a minimum mean square, least squares, recursive least squares, least mean squares, or other estimation algorithm. The filter coefficients may be estimated periodically at predetermined intervals or at other predetermined events, such as when the receiver 725 and/or transmitter 715 are offline, just starting up, or at other times. The estimator of the channel sub-band adaptation unit 793 may generate updated filter coefficient estimates for each sub-band based on the estimate for the respective sub-band. The estimator may calculate the estimates for each sub-band serially one sub-band at a time or in parallel for two or more sub-bands at a time. The full band filter 791 may have an asymmetric frequency response and complex filter coefficients since the outputs from ADC 714 may be complex valued.

In some instances, the channel sub-band adaptation unit 793 may include a comparator having logic for comparing a root mean square (RMS) power of the outgoing signal on the observation signal path 750 and the incoming signal on the receiver signal path 760. In some instances the comparator may compare the power of incoming signal on the receiver signal path 760 to a predetermined maximum value or to the corresponding power of the outgoing signal. The comparator may also include logic for activating the estimator in the channel sub-band adaptation unit 793 when the power of the incoming signal is less than the predetermined maximum value or when a difference of the compared power values of the incoming and outgoing signals exceeds a threshold. The activation of the estimator by the comparator may trigger the estimator to generate updated estimates for one or more channels or sub-bands of the received incoming signal.

A sub-band to full band synthesizer 792 may be coupled to the sub-band adaptation unit 793 and the full band filter 791. The synthesizer 792 may convert the estimated filter coefficients for each of the sub-bands into filter coefficients for the full band. Thus, the filter coefficients for the full band may be reconstituted from the individual coefficients calculated for each sub-band by the synthesizer 792. Once all of the channels have been updated, the filter coefficients for the full band generated at the synthesizer 792 may be used to set the filter coefficients in the full band filter 791. This allows filter coefficients for the full band filter 791 to be updated to improve noise cancellation independent of the digital front end so that user wanting to apply their own customized signal processing functions to incoming received signals can do so by connecting their own digital front end.

In instances where the sub-band adaptation unit 793 included a frequency domain adaptive filter 794, the synthesizer 792 may include an inverse fast Fourier transform (IFFT) module 795. The IFFT module 795 may convert the estimated coefficients in the frequency domain for each bin corresponding to an active sub-band into a set of filter coefficients for the full signal band in the time domain. Using the frequency domain adaptive filter 794 and the IFFT module 795 may reduce the complexity of calculations that are required to reconstitute the full band filter coefficients by preserving orthogonality between the different sub-bands.

In some instances, a first mixer 728 may be coupled to the receiver 725 and the first ADC 730. The first mixer may mix the incoming radio frequency signal with an oscillating signal from an oscillating source 721. A second mixer 712 may be coupled to the transmitter 715 and the second ADC 714. The second mixer 712 may mix the outgoing signal with the oscillating signal from the oscillating source 721. A radio frequency amplifier 726 and a first band pass filter 727 may be coupled between the receiver 725 and the first mixer 728. A second band pass filter 711 coupled to the transmitter 715 and the second mixer 712. A first low pass filter 729 may be coupled to the first mixer 728 and the first ADC 730. A second low pass filter 713 may be coupled to the second mixer 712 and the second ADC 714.

Figure 7:
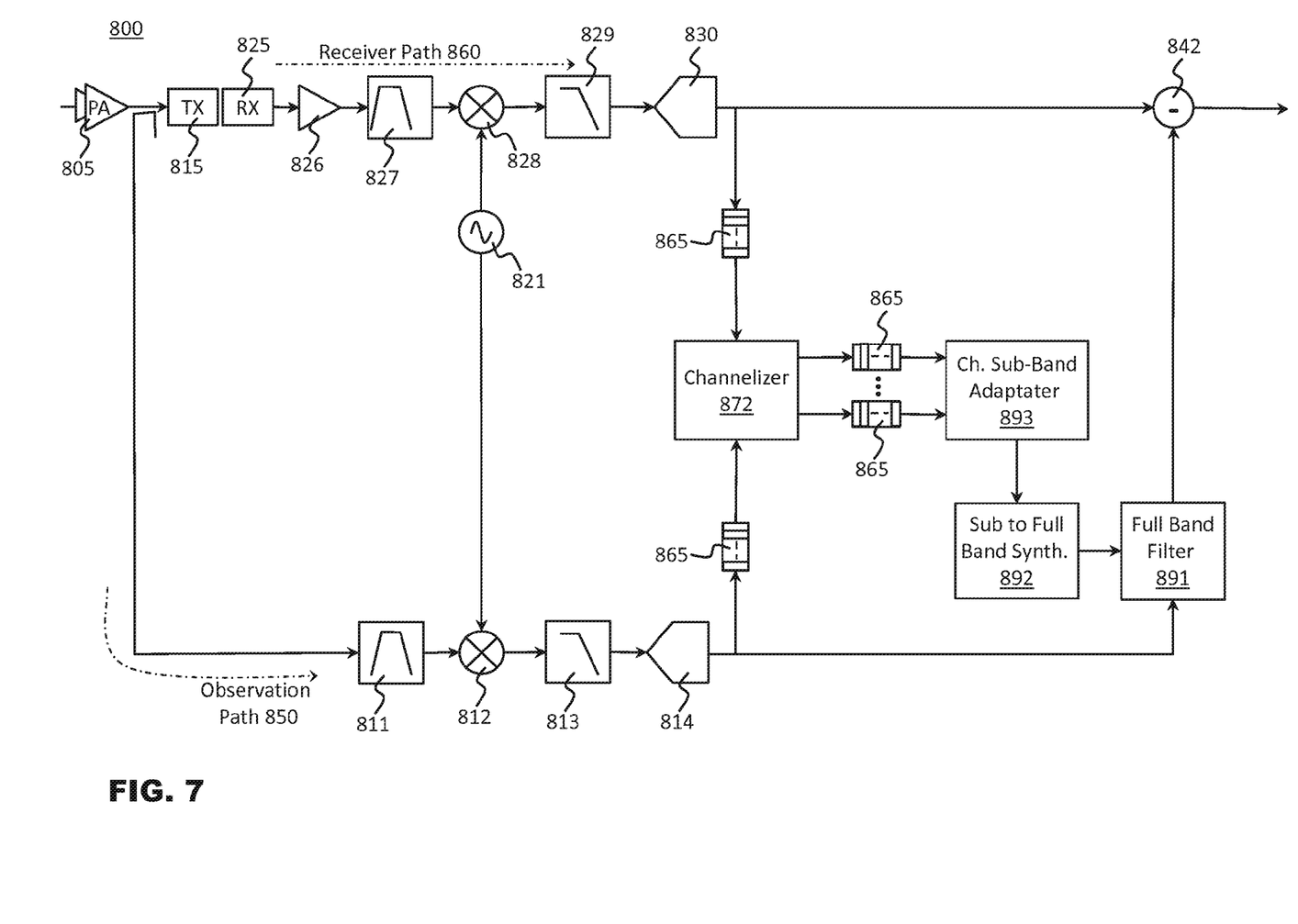
FIG. 7 shows a sixth exemplary circuit in an embodiment.

FIG. 7 shows an embodiment 800 in which filter coefficients of a full band filter 891 are adapted on a sub-band basis. A transmitter 815 may transmit outgoing RF signals. A receiver 825 may receive incoming RF signals. The transmitter 815 may be coupled to a RF power amplifier 805 that may amplify outgoing signals to drive an antenna of the transmitter 815. A first ADC 830 may be coupled to the receiver 825, a channelizer 872, and a subtractor 842. An incoming RF signal received at receiver 825 may propagate along a receiver signal path 860. A second ADC 814 may be coupled to the transmitter 815, channelizer 872, and full band noise cancellation filter 891. The full band filter 891 may be coupled to subtractor 842 and ADC 814. The subtractor 842 may subtract the estimated noise outputted by the full band filter 891 from the digitized received incoming signal. An outgoing signal to be transmitted at transmitter 815 may be propagated along observation path 850 from the output of the power amplifier 805 in addition to being transmitted at transmitted at transmitter 815.

The channelizer 872 may down convert and/or channelize the signals outputted by the respective ADC 814 and 830. During the channelizing, the channelizer 872 may split the respective signals into separate sub-bands, which may, but need not, include one or more channels. In some instances, the channelizer 872 may include a separate output for each designated sub-band within an incoming RF signal band. In some instances, the channelizer 872 may only output signals on a sub-band by sub-band basis for those sub-bands that are active. The signals for each sub-band may outputted serially, one sub-band at a time, or in parallel. In instances where the signals for each sub-band are outputted by the channelizer 872 serially, the channelizer 872 may include a serialized digital downconverter and channel core filter. The channelizer 872 need not generate output signals for inactive channels. In some instances, the channelizer 872 may include a DDC, a polyphase, a fast Fourier transform, and/or other type of transmultiplexer.

In some instances, one or more buffers 865 may be coupled to the inputs and/or outputs of the channelizer 872. Buffers 865 may temporarily store copies of the digitized signals on the receiver signal path 760 and observation signal path 750 that are supplied as inputs to the channelizer 872. Buffers 865 may also temporarily stores copies of channelized signals outputted by the channelizer 872 that are subsequently used as inputs to the channel sub-band adapter 893 coupled to the channelizer 872 and/or buffers 865. Buffers 865 may be used in instances where the channelizer 872 operates serially in that the channelizer 872 is configured to output a signal for one sub-band at a time. The buffers 865 may also include an alignment module that may be configured to add a delay or otherwise time align a buffered signal originating from receiver signal path 860 with a corresponding buffered signal originating from the observation signal path 850. The alignment module may then time align serial signals outputted by the channelizer 872 at different times even though the signals may correspond to each other for noise cancellation purposes.

The channelizer 872 and/or buffers 865 may be coupled to a channel sub-band adaptation unit 893. The channel sub-band adaptation unit 893 may estimate filter coefficients of a noise cancellation filter on each of the sub-bands of the received incoming signals outputted by the channelizer 872. A sub-band may include any subdivision of a designated full signal band and may include one or more channels or subportions thereof. By estimating the filter coefficients on a sub-band basis, the estimation calculation may be performed on only those activate channels or sub-bands. This avoids the need to analyze inactive channels that may contain external blockers or signals from other sources appearing the designated signal band. The channel sub-band adaptation unit 893 may therefore eliminate any influence of external blockers by analyzing only active channels. This improves the accuracy and convergence times of filter coefficient generation process for the full band noise cancellation filter. A sub-band to full band synthesizer 892 coupled to the sub-band adaptation unit 893 may then reconstruct estimated filter coefficients for the full signal band by reconstituting the full band coefficients from the individual estimated filter coefficients of each sub-band performed by the sub-band adaptation unit 893.

In some instances, the channel sub-band adaptation unit 893 may include a frequency domain adaptive filter 794. A frequency domain adaptive filter 794 may perform adaptation by estimate filter coefficients for each sub-band in a frequency domain. Different sub-bands may be assigned to different bins corresponding to particular frequency ranges. Bins for different sub-bands may be weighted differently according to the estimates for the respective sub-band. External blockers may be rejected by weighting the bins corresponding to frequency ranges of the external blockers accordingly.

The estimated filter coefficients for each sub-band may be based on a comparison of the digitized received incoming signal to the digitized outgoing signal transmitted at the transmitter 815. To make this comparison, the sub-band adaptation unit 893 may be coupled to both the ADC 830 in the receiver path 860 and then ADC 814 in the observation path 850 via channelizer 872. The estimates for the one or more sub-bands may then be used to generate filter coefficients that independently adapt each respective sub-band. In some instances, this adaptation may occur in real time, but in other instances the estimation and adaptation may be delayed. In some instances the adaptation of one or more sub-bands may occur off-line during an interval when the receiver is not receiving any incoming signals or in non-real time.

The channel sub-band adaptation unit 893 may use an estimation algorithm, such as a minimum mean square, least squares, recursive least squares, least mean squares, or other estimation algorithm to estimate the filter coefficients. The coefficients may be estimated periodically at predetermined intervals or at other predetermined events, such as when the receiver 825 and/or transmitter 815 are offline, just starting up, or at other times. The estimator of the channel sub-band adaptation unit 893 may generate updated filter coefficients for each sub-band based on the estimates for the respective sub-band. The estimator may calculate the estimates for each sub-band serially one sub-band at a time or in parallel for two or more sub-bands at a time. The full band filter 891 may have an asymmetric frequency response and complex filter coefficients since the outputs from ADC 814 may be complex valued.

In some instances, the channel sub-band adaptation unit 893 may include a comparator having logic for comparing a root mean square (RMS) power of the outgoing signal on the observation signal path 850 and the incoming signal on the receiver signal path 860. In some instances the comparator may compare the power of incoming signal on the receiver signal path 860 to a predetermined maximum value or to the corresponding power of the outgoing signal. The comparator may also include logic for activating the estimator in the channel sub-band adaptation unit 893 when the power of the incoming signal is less than the predetermined maximum value or when a difference of the compared power values of the incoming and outgoing signals exceeds a threshold. The activation of the estimator by the comparator may trigger the estimator to generate updated filter coefficient estimates for one or more channels or sub-bands of the received incoming signal.

A sub-band to full band synthesizer 892 may be coupled to the sub-band adaptation unit 893 and the full band filter 891. The synthesizer 892 may convert the filter coefficient estimates for each of the sub-bands into estimated coefficients for the full band. Thus, the estimated coefficients for the full band may be reconstituted from the individual coefficients calculated for each sub-band by the synthesizer 892. Once all of the channels have been updated, the generated coefficients for the full band may be used to set the filter coefficients in the full band filter 891. This allows filter coefficients for the full band filter 891 to be updated to improve noise cancellation independent of the digital front end so that user wanting to apply their own customized signal processing functions to incoming received signals can do so by connecting their own digital front end.

In instances where the sub-band adaptation unit 893 includes a frequency domain adaptive filter 794, the synthesizer 892 may include an inverse fast Fourier transform (IFFT) module 795. The IFFT module 795 may converted the estimated coefficients in the frequency domain for each bin corresponding to an active sub-band into coefficients for the full signal band in the time domain. Using the frequency domain adaptive filter 794 and the IFFT module 795 may reduce the complexity of calculations that are required to reconstitute the full band filter coefficients by preserving orthogonality between the different sub-bands.

In some instances, a first mixer 828 may be coupled to the receiver 825 and the first ADC 830. The first mixer may mix the incoming radio frequency signal with an oscillating signal from an oscillating source 821. A second mixer 812 may be coupled to the transmitter 815 and the second ADC 814. The second mixer 812 may mix the outgoing signal with the oscillating signal from the oscillating source 821. A radio frequency amplifier 826 and a first band pass filter 827 may be coupled between the receiver 825 and the first mixer 828. A second band pass filter 811 coupled to the transmitter 815 and the second mixer 812. A first low pass filter 829 may be coupled to the first mixer 828 and the first ADC 830. A second low pass filter 813 may be coupled to the second mixer 812 and the second ADC 814.

The foregoing description has been presented for purposes of illustration and description. It is not exhaustive and does not limit embodiments to the precise forms disclosed. Modifications and variations are possible in light of the above teachings or may be acquired from the practicing embodiments consistent with those described herein. For example, in some embodiments the channelization of the incoming and outgoing signals may be performed by the digital down converter but in other instances the channelization may be performed independent of the down conversion. Additionally, in some embodiments the transmitter and the receiver may be independent from each other with their own antennas but in other embodiments the transmitter and receiver may be part of a transceiver and/or coupled to a single antenna through a duplexer. Finally, in some instances the bandwidths of each channel may be based on those specified by a particular communications standard, but in other instances the channelization may be applied on a customized sub band basis independent of any channel bandwidth dictated by the communications standard. For example, while the third generation cellular W-CDMA standard divides the band up into 5 MHz channels, depending on the duplexer complexity, the presence of external blockers, or other criteria noise filter cancellation may be applied on a channelized sub band basis different from the 5 MHz channels dictated by this standard.

We claim:

1. A circuit for cancelling noise in a received signal caused by a transmitted signal, comprising:
   a noise cancellation filter having a set of filter coefficients configured to
      estimate a transmitter noise leakage across a band of the received signal, the band comprising a plurality of sub-bands, wherein a first sub-band of the plurality of sub-bands comprises a first active channel, wherein a second sub-band of the plurality of sub-bands comprises a second active channel, and wherein a third sub-band of the plurality of sub-bands is inactive;
   a sub-band adaptation unit configured to perform operations comprising:
      estimating a first filter coefficient based on the first sub-band; and
      estimating a second filter coefficient based on the second sub-band;
      applying a first weight to the first filter coefficient to generate a weighted first filter coefficient;
      applying a second weight to the second filter coefficient to generate a weighted second filter coefficient; and
   a synthesizer coupled to the sub-band adaptation unit, the synthesizer configured to
      generate the set of filter coefficients based at least in part on the weighted first filter coefficient and the weighted second filter coefficient, wherein the generating of the set of filter coefficients omits consideration of the third sub-band.

2. The circuit of claim 1, further comprising:
a frequency domain adaptive filter in the sub-band adaptation unit, the frequency domain adaptive filter configured to estimate each filter coefficient on the sub-band basis in a frequency domain for at least one sub-band of the band; and
an inverse fast Fourier transform module in the synthesizer, the inverse fast Fourier transform module configured to covert the estimated filter coefficient(s) in the frequency domain for each sub-band into the estimated filter coefficients across the first band in a time domain.

3. The circuit of claim 1, further comprising:
a channelizer coupled to the sub-band adaptation unit, the channelizer configured to split the received signal and a transmitted signal inputted to the noise cancellation filter into at least the first sub-band and the second sub-band; and
a buffer storing the split received signal and the split transmitted signal outputted by the channelizer.

4. The circuit of claim 3, further comprising:
a serial digital down converter and channel filter in the channelizer configured to serially down convert and channelize the received signal and the transmitted signal one sub-band at a time; and
an alignment module delaying the channelized received signal and the channelized transmitted signal until corresponding sections of the channelized received and transmitted signals are time aligned.

5. The circuit of claim 1, further comprising:
a transmitter;
a receiver to receive an incoming radio frequency signal;
a first analog to digital converter (ADC) coupled to the receiver and the sub-band adaptation unit;
a second analog to digital converter (ADC) coupled to the transmitter, the sub-band adaptation unit, and the noise cancellation filter;
a subtractor coupled to the first ADC and the noise cancellation filter; a first mixer coupled between the receiver and the first ADC, the first mixer mixing the received incoming radio frequency signal with an oscillating signal;
a second mixer coupled between the transmitter and the second ADC, the second mixer mixing the received incoming radio frequency signal with an oscillating signal;
a radio frequency amplifier and a first band pass filter coupled between the receiver and the first mixer;
a first low pass filter coupled between the first mixer and the first ADC;
a second band pass filter coupled between the transmitter and the second mixer; and
a second low pass filter coupled between the second mixer and the second ADC.

6. The circuit of claim 1, wherein the sub-band adaption unit comprises a comparator to compare a power of the transmitted signal to a power of the received signal.

7. The circuit of claim 1, wherein the sub-band adaption unit estimates the at least one filter coefficient while the received signal is received by a receiver.

8. The circuit of claim 1, wherein the sub-band adaption unit estimates the at least one filter coefficients after the received signal is received by a receiver.

9. A method for cancelling noise in a received signal caused by a transmitted signal, comprising:
receiving a received signal comprising a first band, the first band comprising a plurality of sub-bands,
wherein a first sub-band of the plurality of sub-bands comprises a first active channel,
wherein a second sub-band of the plurality of sub-bands comprises a second active channel, and
wherein a third sub-band of the plurality of sub-bands is inactive;
generating a first sub-band estimated filter coefficient describing the first sub-band of the first band;
generating a second sub-band estimated filter coefficient describing the second sub-band;
generating a set of full-band filter coefficients across the first band based at least in part on the first sub-band filter coefficient and the second sub-band filter coefficient,
wherein the generating of the set of full-band filter coefficients omits consideration of the third sub-band;
filtering the received signal based at least in part on the first sub-band filter coefficient and the second sub-band filter coefficient; and
updating the filtering based at least in part on the set of full-band filter coefficients.

10. The method of claim 9, further comprising:
estimating a first sub-band estimated filter coefficient for a first sub-band in a frequency domain; and
applying an inverse Fourier transform to the first sub-band estimated filter coefficient in the first sub-band, wherein generating the set of full-band filter coefficients is based at least in part on the inverse Fourier transform.

11. The method of claim 9, further comprising:
channelizing the received signal into a split received signal including at least one sub-band;
channelizing the transmitted signal into a split transmitted signal include at least one sub-band; and
delaying at least one of the split received signal and the split transmitted signal to time align corresponding sections of the split received signal and the split transmitted signal.

12. The method of claim 11, further comprising:
serially down-converting the received signal; and
serially down-converting the transmitted signal.

13. The method of claim 9, further comprising subtracting a result of the filtering from the received signal.

14. The method of claim 9, wherein generating the first sub-band filter coefficient and the second sub-band filter coefficient comprises comparing a power of the transmitted signal to a power of the received signal.

15. The method of claim 9, further comprising generating the first sub-band filter coefficient and the second sub-band filter coefficient while the received signal is received by a receiver.

16. The method of claim 9, further comprising generating the first sub-band filter coefficient and the second sub-band filter coefficient after the received signal is received by a receiver.

17. A system for cancelling noise in a received signal caused by a transmitted signal, comprising:
means for receiving a received signal comprising a first band, the first band comprising a plurality of sub-bands,
wherein a first sub-band of the plurality of sub-bands comprises a first active channel,
wherein a second sub-band of the plurality of sub-bands comprises a second active channel, and
wherein a third sub-band of the plurality of sub-bands is inactive;
means for generating a first sub-band estimated filter coefficient describing the first sub-band;

means for generating a second sub-band estimated filter coefficient describing the second sub-band;

means for generating a set of full-band filter coefficients across the first band based at least in part on the first sub-band filter coefficient and the second sub-band filter coefficient, wherein the generating of the full-band set of filter coefficients omits consideration of the third sub-band;

means for filtering the received signal based at least in part the first sub-band filter coefficient and the second sub-band filter coefficient; and means for updating the filtering based at least in part on the set of full-band filter coefficients.

18. The system of claim 17, further comprising:

means for estimating a first sub-band estimated filter coefficient for a first sub-band in a frequency domain; and means for applying an inverse Fourier transform to the first sub-band estimated filter coefficient in the first sub-band, wherein generating the set of full-band filter coefficients is based at least in part on the inverse Fourier transform.

19. The system of claim 17, further comprising:

means for channelizing the received signal into a split received signal including at least one sub-band;

means for channelizing the transmitted signal into a split transmitted signal include at least one sub-band; and means for delaying at least one of the split received signal and the split transmitted signal to time align corresponding sections of the split received signal and the split transmitted signal.

20. The system of claim 17, wherein the means for generating the first sub-band filter coefficient and the second sub-band filter coefficient comprises means for comparing a power of the transmitted signal to a power of the received signal.

* * * * *